Feb. 27, 1951 A. G. EMSLIE 2,543,449

RADIO PULSE-ECHO MOVING OBJECT DETECTION SYSTEM

Filed May 17, 1945

INVENTOR.
ALFRED G. EMSLIE
BY William D. Hall
ATTORNEY

Patented Feb. 27, 1951 2,543,449

UNITED STATES PATENT OFFICE 2,543,449

RADIO PULSE-ECHO MOVING OBJECT DETECTION SYSTEM

Alfred G. Emslie, Boston, Mass., assignor, by mesne assignments, to the United States of America as represented by the Secretary of War Application May 17, 1945, Serial No. 594,263

6 Claims. (Cl. 343—9)

The present invention relates to radio object-location systems of a character adapted to distinguish fixed-objects from moving-objects, and which may provide object-velocity information in the case of the latter.

Systems of this general nature are often referred to as coherent pulse-echo systems. One system of this character is more fully described in a copending application of Robert H. Dicke, Serial No. 590,052 filed April 24, 1945.

Radio object-location systems which distinguish between fixed-objects and moving-objects utilize a reference wave train or timing wave, as it is sometimes called, initiated at the receiver and having a fixed phase relative to the phase of the transmitted exploratory pulses. Returning echo-pulses are combined or mixed with the reference wave train to produce video pulses which are supplied to a suitable indicator.

Fixed-object returned echo-pulses will always have the same phase relative to the reference wave train, whereas moving-object returned echo-pulses will have a progressive phase shift relative to the timing wave, the rate of said phase shift depending upon the velocity of the object. When an echo-pulse is combined with the timing wave, it reinforces or opposes the timing wave depending upon the relative phase between the two. Fixed-object echo-pulses combine to produce a constant amplitude video pulse (because of the constant phase relation), whereas moving-object echo-pulses periodically reinforce and oppose the reference oscillations in varying amounts to produce video pulses of varying amplitude.

In the instance of a moving object, succeeding echo-pulses have a different relative phase with respect to the timing wave and the reinforcing or opposing action is generally periodic. It can be seen, therefore, that moving-objects are manifested by video pulses having a periodic variation of amplitude, whereas fixed-objects are manifested by constant-amplitude video pulses. It is, therefore, apparent that moving-objects and fixed-objects are readily distinguished by observing the character of the video pulses obtained therefrom.

In a system of this general type, further velocity information may be provided if so desired. This is based on the fact that the modulation envelope of a plurality of video pulses, manifesting a moving object, is cyclical, and the frequency of this modulation envelope affords means for indicating velocity either aurally or visually.

It is an object of the present invention to provide an improved coherent pulse-echo system which contemplates the elimination of certain components included in the above described and referred to systems.

Figure 1:
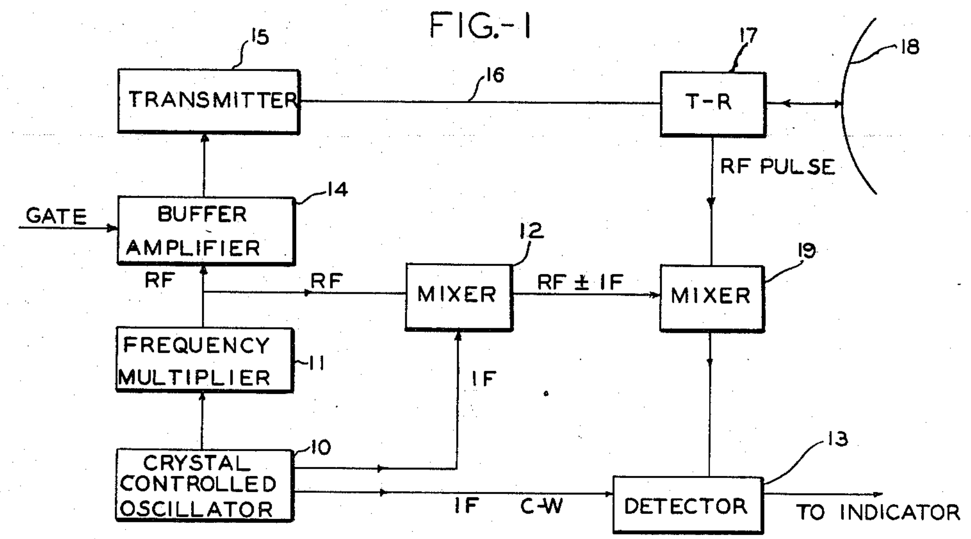
Figure 2:
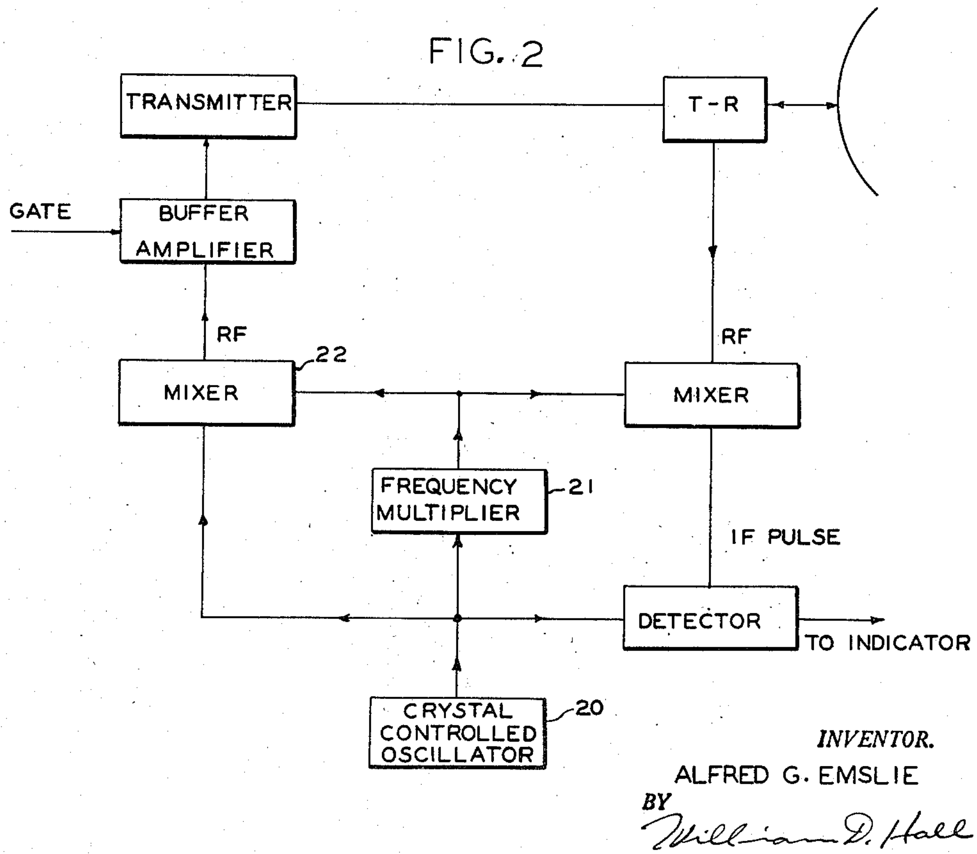

The above and other objects and advantages will appear more fully in connection with the following description when taken together with the accompanying drawing wherein:

Fig. 1 is a schematic diagram in block form of a first embodiment of the present invention and, Fig. 2 is a similar diagram of a second embodiment of the present invention.

Referring now to Fig. 1, crystal-controlled oscillator 10 generates relatively stable intermediate-frequency continuous wave oscillations which are applied to frequency multiplier 11, mixer 12, and detector 13. The output of frequency multiplier 11 consists of oscillations at a radio-frequency substantially equal to the carrier-frequency of the transmitted exploratory pulses. The term "carrier frequency" of a pulse as here used refers generally to the central frequency of the band of frequencies contained in a pulse.

As one example, the output of crystal controlled oscillator 10 may consist of relatively stable intermediate-frequency oscillations at thirty megacycles, and it may be desired to obtain stable three-thousand-megacycle oscillations. This may be achieved by two stages of frequency multiplication, each stage increasing the frequency by a factor of ten. The first stage may comprise a crystal-controlled triode oscillator, tuned to three-hundred-megacycles and synchronized by the crystal-controlled oscillations. The second stage may comprise a velocity-modulated frequency-multiplier, synchronized by the three-hundred-megacycle oscillations, and supplying oscillations at three-thousand-megacycles. One frequency multiplier of this latter type is described on page 335 of "Ultra-High Frequency Techniques" by Brainerd et al., published July 1942 by D. Van Nostrand Company, Inc.

The term "gate voltage" or "gating voltage," as hereinafter used, refers to a voltage waveform having positive and negative-going portions of substantially rectangular waveform. The circuit producing the gate voltage may be synchronized, or actuated, to function at a particular moment so that one set of conditions are present when the gate is positive and a different set of conditions are present when the gate is negative going.

The output of frequency multiplier 11 is applied to mixer 12, and gated buffer-amplifier 14. The gate-voltage applied to said buffer-amplifier may have a rectangular waveform which functions to provide an output from said amplifier that consists of short-duration pulses having a carrier-frequency substantially equal to the frequency of the output from frequency multiplier 11. Said pulses are applied as a driving signal to transmitter 15 which may be a magnetron synchronized by the carrier-frequency output of buffer amplifier 14. The output of transmitter 15 consists of short-duration, high carrier-frequency exploratory pulses of radiant energy which may be fed by a suitable transmission line 16 through a customary transmit-receive switch 17 to directional antenna 18.

The function of transmit-receive switch 17 is to connect transmitter 15 to antenna 18 and to disconnect the receiver while exploratory pulses are being transmitted. During the interim beween transmitted pulses, transmit-receive switch 17 disconnects antenna 18 from transmitter 15 and connects it to a receiver channel presently to be described.

The radio-frequency oscillations from frequency multiplier 11, and the intermediate-frequency oscillations from crystal controlled oscillator 10 are combined in mixer 12, the output of said mixer consisting of radio-frequency oscillations equal to either the sum or difference of the two inputs. The choice of adding or subtracting the inputs to mixer 12 is arbitrary and does not affect the video pulses finally produced. The output of said mixer is then applied as an input to mixer 19.

Object-returned echo-pulses received by antenna 18 are fed through transmit-receive switch 17 to mixer 19. The output circuit of mixer 19 is tuned to the difference of the two input frequencies thereto. Issuing from mixer 19 and applied to detector 13 are object-returned echo-pulses having intermediate-frequency carrier oscillations. This intermediate frequency is substantially equal to the frequency of oscillator 10.

As mentioned, the stable intermediate-frequency oscillations from crystal-controlled oscillator 10 that are applied to detector 13 act as a reference wave train or timing wave. The two inputs to detector 13 are algebraically combined therein, and the resulting combination is detected to provide video pulses. These video pulses are fed to a suitable indicator such as a cathode ray tube.

As heretofore mentioned, for fixed-object returned echo-pulses the phase of the intermediate-frequency pulse input to detector 13, relative to the phase of the reference wave train, is constant, and the output of detector 13 therefore includes video pulses of constant amplitude. For moving-object returned echo-pulses, the phase of the intermediate frequency pulse input to detector 13 with respect to the reference wave train is continually changing, and the output of said detector 13 includes video pulses having a cyclical variation in amplitude.

Referring now to Fig. 2 which shows a second embodiment of the present invention, crystal-controlled oscillator 20 provides a relatively stable intermediate-frequency input to frequency multiplier 21. The frequency of the output issuing from multiplier 21 differs from the carrier-frequency of the exploratory pulses by an amount substantially equal to the relatively stable intermediate-frequency. A portion of the output of frequency multiplier 21 is applied as an input to mixer 22, another input to said mixer being intermediate-frequency oscillations from crystal controlled oscillator 20. The output circuit of mixer 22 is tuned to the sum or difference of the two inputs depending on the output of frequency multiplier 21, to provide continuous wave oscillations at substantially the carrier-frequency of the transmitted pulse. In other respects, the system is the same as the embodiment shown in Fig. 1.

In radio object-location systems of this type, it has been found that the intermediate-frequency oscillations are more easily stabilized than are the radio-frequency oscillations. Thus one advantage of the present invention is that stable radio-frequencies are more easily obtained by eliminating the radio-frequency local oscillator entirely, and instead, deriving stable radio-frequency oscillations from stable intermediate-frequency oscillations.

A crystal-controlled oscillator may be used to provide relatively stable intermediate-frequency oscillations, and these may be multiplied by a frequency-multiplier such as the type described above. The radio-frequency oscillations issuing from the frequency multiplier may then be gated and used to drive the transmitter. If a crystal-controlled intermediate oscillator is used to provide relatively stable oscillations, a capacitance connected in shunt with the crystal can be used to tune the oscillator sufficiently to accommodate differences in magnetrons.

Having thus described the invention what is claimed as new and desired to be secured by Letters Patent is:

1. A radio object-location system of the character described, including means for generating relatively stable intermediate-frequency reference oscillations, a frequency-multiplier and means for applying said reference oscillations thereto to obtain therefrom relatively stable radio-frequency continuous-wave oscillations, a gated buffer-amplifier and means for applying said radio-frequency oscillations to said buffer-amplifier, the output therefrom consisting of relatively short-duration pulses having a carrier-frequency substantially equal to said radio-frequency oscillations, transmitting means for said pulses, a mixer and means for applying thereto said continuous-wave radio-frequency oscillations and said relatively stable reference oscillations, a second mixer, means for receiving object-returned echo pulses, and means for applying said echo-pulses and the output of said first-mentioned mixer to said second mixer, the output of said second mixer consisting of echo pulses having intermediate-frequency carrier oscillations, a detector, means for applying thereto said relatively stable intermediate-frequency reference oscillations and said last-mentioned echo pulses, means therein for combining said oscillations and said echo pulses to obtain video pulses, and indicator means for obtaining object velocity information from said video pulses.

2. A radio object-location system of the character described including, means for generating relatively stable intermediate-frequency reference oscillations, a frequency-multiplier and means for applying said reference oscillations thereto to obtain therefrom relatively stable radio-frequency oscillations, a mixer, and means for applying said radio-frequency continuous-wave oscillations and said reference oscillations thereto, a gated buffer-amplifier and means for applying the output of said mixer to said buffer-amplifier, the output thereof consisting of relatively short-duration pulses having a carrier-frequency equal to the frequency of the oscillations forming the output of said mixer, transmitting means for said pulses, means for receiving object-returned echo pulses, a second mixer, means for applying said echo pulses and said frequency-multiplier output to said second mixer, the output of said second mixer consisting of echo pulses having intermediate-frequency carrier oscillations, a detector, means for applying thereto said relatively stable intermediate-frequency reference oscillations and said last-mentioned echo pulses, means therein for combining said oscillations and said echo pulses to obtain video pulses, and indicator means for obtaining object velocity information from said video pulses.

3. A radio object-location system of the character described including means for generating relatively stable reference oscillations, a frequency-multiplier, and means for applying said reference oscillations to said frequency-multiplier to obtain therefrom relatively stable radio frequency oscillations, means for producing from said radio-frequency continuous-wave oscillations relatively short-duration pulses of radiant energy, transmitting means for said pulses, means for receiving resultant object returned echo pulses, and means for combining said echo pulses with said reference oscillations to obtain video pulses.

4. A radio object-location system including means for generating relatively short-duration pulses of radiant energy, transmitting means for said pulses, means for receiving resultant object-returned echo pulses, said first-mentioned means comprising means for generating stable reference frequency oscillations, means for deriving radio frequency continuous-wave oscillations from said reference oscillations, the said radio frequency being a multiple of the reference frequency, means for producing from said radio frequency continuous-wave oscillations short-duration pulses of radiant energy, means for combining said echo-pulses with said reference oscillations to obtain video pulses, and means for indicating said video pulses.

5. A radio object-location system of the character described including, means for generating stable continuous-wave reference oscillations, means for generating a plurality of harmonics of said reference oscillations to obtain therefrom stable continuous-wave oscillations of a plurality of radio frequencies, a gated buffer-amplifier and means for applying a first of said radio frequency continuous-wave oscillations to said buffer-amplifier, the output thereof consisting of relatively short-duration pulses, having a carrier-frequency equal to the frequency of said first radio-frequency oscillations, transmitting means for said pulses, means for receiving object returned echo pulses, a mixer, means for applying said echo pulses and a second of said radio-frequency oscillations to said mixer, the output of said mixer consisting of echo pulses having intermediate-frequency carrier oscillations, a detector, means for applying thereto said relatively stable reference oscillations and said last-mentioned echo pulses, means therein for combining said oscillations and said echo pulses to obtain video pulses, and indicator means for obtaining object velocity information from said video pulses.

6. A radio object-location system of the character described including, means for generating stable continuous-wave reference oscillations, means for generating a plurality of harmonics of said reference oscillations to obtain therefrom stable continuous-wave oscillations of a plurality of radio frequencies, means for deriving from a first of said radio-frequency continuous-wave oscillations short-duration pulses having a carrier-frequency equal to the frequency of said first radio-frequency oscillations, transmitting means for said pulses, means for receiving object returned echo pulses, a mixer, means for applying said echo pulses and a second of said radio frequency oscillations to said mixer, the output of said mixer consisting of echo pulses having intermediate-frequency carrier oscillations, a detector, means for applying thereto said relatively stable reference oscillations, said last-mentioned echo pulse and means therein for combining said oscillations and said echo pulses to obtain video pulses, and indicator means for obtaining object velocity information from said video pulses.

ALFRED G. EMSLIE.

REFERENCES CITED

The following references are of record in the file of this patent:

UNITED STATES PATENTS

| Number | Name | Date |
|---|---|---|
| 2,050,418 | Boerner | Aug. 11, 1936 |
| 2,421,020 | Earp | May 27, 1947 |
| 2,423,082 | Busignies | July 1, 1947 |

FOREIGN PATENTS

| Number | Country | Date |
|---|---|---|
| 497,147 | Great Britain | Dec. 9, 1938 |